(12) United States Patent
Wang

(10) Patent No.: US 11,471,792 B2
(45) Date of Patent: Oct. 18, 2022

(54) FILTERING DEVICE AND FILTERING METHOD

(71) Applicant: WUHAN CHINA STAR OPTOELECTRONICS SEMICONDUCTOR DISPLAY TECHNOLOGY CO., LTD., Hubei (CN)

(72) Inventor: Xuanyun Wang, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 564 days.

(21) Appl. No.: 16/473,147

(22) PCT Filed: Mar. 19, 2019

(86) PCT No.: PCT/CN2019/078775
§ 371 (c)(1),
(2) Date: Jun. 24, 2019

(87) PCT Pub. No.: WO2020/124829
PCT Pub. Date: Jun. 25, 2020

(65) Prior Publication Data
US 2021/0354052 A1    Nov. 18, 2021

(30) Foreign Application Priority Data
Dec. 19, 2018 (CN) .......................... 201811552181.3

(51) Int. Cl.
*B01D 19/00* (2006.01)
*B01D 36/00* (2006.01)

(52) U.S. Cl.
CPC ..... *B01D 19/0031* (2013.01); *B01D 19/0068* (2013.01); *B01D 36/001* (2013.01)

(58) Field of Classification Search
CPC ............ B01D 19/0031; B01D 19/0068; B01D 36/001
See application file for complete search history.

(56) References Cited

U.S. PATENT DOCUMENTS 4,775,482 A    10/1988    Thurman
5,785,983 A     7/1998    Furlan et al.
(Continued)

FOREIGN PATENT DOCUMENTS

CN    1066790 A    12/1992
CN    1376533 A    10/2002
(Continued)

OTHER PUBLICATIONS

CN-204009357-U_English Translation (Year: 2014).*
CN-1492261-A_English Translation (Year: 2004).*

*Primary Examiner* — Youngsul Jeong

(57) ABSTRACT

A filtering device and a filtering method are provided. The filtering device includes a bubble filtering system. The bubble filtering system at least includes a first bubble filtering system and a second bubble filtering system. The first bubble filtering system configured for performing a first bubble filtration in the solution. The second bubble filtering system configured for performing a second bubble filtration in the solution. Filter fineness of the second bubble filtering system is higher than filter fineness of the first bubble filtering system.

15 Claims, 3 Drawing Sheets

(56) References Cited

U.S. PATENT DOCUMENTS

2005/0175472 A1    8/2005   Udagawa
2009/0151355 A1    6/2009   Fujie et al.

FOREIGN PATENT DOCUMENTS

| CN | 1492261 | A | * | 4/2004 |
| --- | --- | --- | --- | --- |
| CN | 1607975 | A | | 4/2005 |
| CN | 1748985 | A | | 3/2006 |
| CN | 101537269 | A | | 9/2009 |
| CN | 204009357 | U | * | 12/2014 |
| CN | 106215464 | A | | 12/2016 |
| CN | 106823478 | A | | 6/2017 |

* cited by examiner

FILTERING DEVICE AND FILTERING METHOD

FIELD OF INVENTION

The present invention relates to a technical field in display production, and particularly to a filtering device and a filtering method.

BACKGROUND OF DISCLOSURE

Currently, flexible active matrix organic light emitting diode (AMOLED) devices are mainly developed and manufactured on the basis of polyimide (PI). Usually by slit coating or spin coating, polyimide liquid is applied to a glass substrate, and then dried and baked.

Existing polyimide solutions often contain a great number of micron-sized bubbles and gels, and the bubbles cannot be effectively extruded at the time of coating and after coating. In subsequent drying and baking stages, the bubbles diffuse and form pores of a certain size (1 to 4 μm) on a surface of the polyimide, and these pores may cause a falling-off phenomenon in subsequent processes, thereby seriously affecting stability of the subsequent processes.

A current commonly-used method for removing bubbles in a polyimide solution is to leave the polyimide solution in a vacuum environment for a long time (36 to 72 hours), and to keep vacuuming, but such a method has many disadvantages. It takes a long time to meet the requirement of industrial mass production. Moreover, it is likely to cause organic solvents with low melting points in the polyimide solution to volatilize, such as N-methylpyrrolidone, which leads a ratio of the polyimide solution to deviate from an original composition, and results in defects in subsequent coating processes.

Therefore, there is a need of a filtering device and a filtering method to solve the above problems.

SUMMARY OF INVENTION

In the present disclosure, a filtering device and a filtering method are provided to solve the problem that bubbles and a gel existing in a polyimide solution results in defective products in subsequent coating processes.

To solve the above problems, the technical solution provided by the present disclosure is as follows:

In accordance with an aspect of the present disclosure, a filtering device is provided for filtering a solution, and includes:

a bubble filtering system configured for filtrating bubbles in the solution, the bubble filtering system at least includes:

a first bubble filtering system configured for performing a first bubble filtration in the solution;

a second bubble filtering system configured for performing a second bubble filtration in the solution;

a stirring member configured for stirring the solution to release a part of the bubbles in the solution; and a reaction kettle configured for containing the solution;

wherein filter fineness of the second bubble filtering system is higher than filter fineness of the first bubble filtering system.

In the filtering device of the present disclosure, the first bubble filtering system includes a first passage configured for conveying the solution to a first filtering member; and the first filtering member includes first holes with a first diameter for filtering the bubbles in the solution being larger than the first diameter.

In the filtering device of the present disclosure, the second bubble filtering system includes a second passage configured for conveying the solution to a second filtering member; and the second filtering member includes second holes with a second diameter for filtering the bubbles in the solution being larger than the second diameter.

In the filtering device of the present disclosure, the solution is a polyimide solution.

In the filtering device of the present disclosure, the filtering device further includes a gel filtering system for filtering a gel in the solution;

wherein the gel filtering system includes a filter body, the filter body is provided with at least two filter through holes, and the solution passes through the filter through holes.

In the filtering device of the present disclosure, material of the filter body includes aluminum oxide.

In the filtering device of the present disclosure, the filter through holes are non-linear filter through holes.

In the filtering device of the present disclosure, the bubble filtrating system further includes a third bubble filtering system configured for performing a third bubble filtration after the solution is filtered through the gel filtering system;

wherein filter fineness of the third bubble filtering system is higher than the filter fineness of the second bubble filtering system.

In the filtering device of the present disclosure, a diameter of the filter through holes is not smaller than 1 μm in and not greater than 100 μm.

In accordance with an another aspect of the present disclosure, a method is also provided for filtering a solution, and includes:

placing a solution in a reaction kettle, stirring the solution with a stirring member, and allowing the solution to stand for a period of time;

performing a first bubble filtration on the solution with the first bubble filtering system;

performing a second bubble filtration on the solution with the second bubble filtering system;

performing a gel filtration on the solution with a gel filtering system; and performing a third bubble filtration on the solution with the third bubble filtering system;

wherein filter finenesses of the first bubble filtering system, the second bubble filtering system, and the third bubble filtering system are sequentially increased.

In accordance with an another aspect of the present disclosure, a filtering device is provided for filtering a solution, and includes:

a bubble filtering system configured for filtrating bubbles in the solution, the bubble filtering system at least includes:

a first bubble filtering system configured for performing a first bubble filtration in the solution;

a second bubble filtering system configured for performing a second bubble filtration in the solution;

wherein filter fineness of the second bubble filtering system is higher than filter fineness of the first bubble filtering system.

In the filtering device of the present disclosure, the first bubble filtering system includes a first passage configured for conveying the solution to a first filtering member; and the first filtering member includes first holes with a first diameter for filtering the bubbles in the solution being larger than the first diameter.

In the filtering device of the present disclosure, the second bubble filtering system includes a second passage configured for conveying the solution to a second filtering member; and the second filtering member includes second holes with a second diameter for filtering the bubbles in the solution being larger than the second diameter.

In the filtering device of the present disclosure, the solution is a polyimide solution.

In the filtering device of the present disclosure, the filtering device further includes a gel filtering system for filtering a gel in the solution;

wherein the gel filtering system includes a filter body, the filter body is provided with at least two filter through holes, and the solution passes through the filter through holes.

In the filtering device of the present disclosure, material of the filter body includes aluminum oxide.

In the filtering device of the present disclosure, the filter through holes are non-linear filter through holes.

In the filtering device of the present disclosure, the bubble filtrating system further includes a third bubble filtering system configured for performing a third bubble filtration after the solution is filtered through the gel filtering system;

wherein filter fineness of the third bubble filtering system is higher than the filter fineness of the second bubble filtering system.

In the filtering device of the present disclosure, a diameter of the filter through holes is not smaller than 1 μm and not greater than 100 μm.

Beneficial Effects: In the present disclosure, a filtering device and a filtering method are designed to perform the stepwise filtrations on the gel and the bubbles in the solution, thereby improving removal efficiency of the bubbles and the gels in the solution, thereby improving products yield in subsequent coating processes.

BRIEF DESCRIPTION OF DRAWINGS

In order to more clearly illustrate the embodiments of the present invention or the technical solutions in prior arts, the following briefly introduces the accompanying drawings used in the embodiments. Obviously, the drawings in the following description merely show some of the embodiments of the present invention. As regards one of ordinary skill in the art, other drawings can be obtained in accordance with these accompanying drawings without making creative efforts.

DETAILED DESCRIPTION OF PREFERRED EMBODIMENTS

Figure 1:
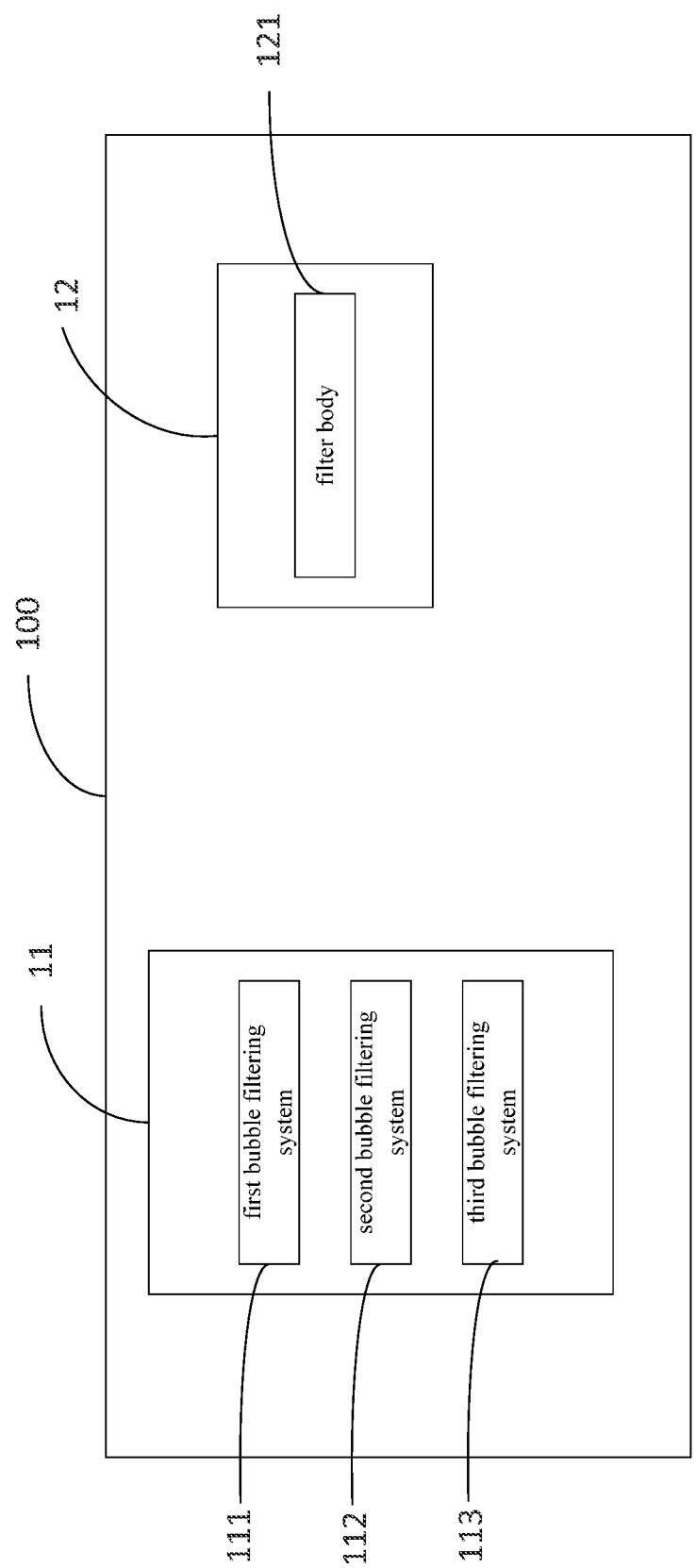
FIG. 1 is a schematic structural view of a filtering device provided in a first embodiment of the present disclosure.

The following description of the embodiments with reference to the accompanying drawings is used to illustrate particular embodiments of the present disclosure. The directional terms referred in the present disclosure, such as "upper", "lower", "front", "back", "left", "right", "inner", "outer", "side surface", etc. are only directions with regard to the accompanying drawings. Therefore, the directional terms used for describing and illustrating the present disclosure are not intended to limit the present disclosure. In the drawings, units with similar structures are indicated by the same reference number.

In the present disclosure, a filtering device and a filtering method are provided to solve the problem that bubbles and a gel existing in a polyimide solution results in defective products in subsequent coating processes.

Referring to FIG. 1, which is a schematic structural diagram of a filtering device 100 in accordance with a first embodiment of the present disclosure.

In accordance with one aspect of the present disclosure, a filtering device 100 is provided for filtering a solution.

In one embodiment, the solution includes, but is not limited to, a polyimide solution.

A filtering device 100 provided by the present disclosure performs stepwise filtrations on the bubbles and the gel in the solution. Herein, the term, "stepwise," can be understood as performing a plurality of filtrations on the bubbles, and can also be understood as performing separate filtrations on the bubbles and the gel.

The filtering device 100 includes a bubble filtering system 11 for filtering the bubbles in the solution.

The bubble filtering system 11 at least includes:

a first bubble filtering system 111 configured for performing a first bubble filtration in the solution;

a second bubble filtering system 112 configured for performing a second bubble filtration in the solution;

wherein filter fineness of the second bubble filtering system 112 is higher than filter fineness of the first bubble filtering system 111.

Herein, the term, "filter fineness," is a degree of filtration of the bubbles in the solution. It can be understood as an ability to filter the bubbles in a certain size in the solution. That is, the higher the filter fineness is, the smaller diameter the bubbles in the solution are filtered. Moreover, it can be understood as a number of the bubbles in the solution after filtration. That is, the higher the filter fineness is, the smaller number the bubbles remain in the solution after filtration.

In one embodiment, the first bubble filtering system 111 includes a first passage configured for conveying the solution to a first filtering member; and the first filtering member includes first holes with a first diameter for filtering the bubbles in the solution being larger than the first diameter.

In one embodiment, the first diameter is no less than 1 μm.

In one embodiment, the first diameter may be 1 μm, e.g., the first bubble filtering system 111 is configured to remove the bubbles with diameters greater than 1 μm in the solution.

In one embodiment, the first filtering member may be a plate-shaped structure, and the plate-shaped structure is provided with first holes. When the first bubble filtration is performed, the solution is filtered through the plate-shaped structure.

In one embodiment, the plate-like structure may be made of a metallic material.

In the embodiment, the second bubble filtering system 112 includes:

a second passage configured for conveying the solution to a second filtering member;

the second filtering member includes second holes with a second diameter for filtering the bubbles in the solution being larger than the second diameter.

In one embodiment, the second diameter is no less than 0.45 μm and no greater than 1 μm.

In one embodiment, the second diameter may be 0.45 μm. In other words, the second filtering system is configured to remove the bubbles with diameters greater than 0.45 μm in the solution. That is, on the basis of the first bubble filtering system 111, a finer bubble filtration is performed, thereby effectively increasing bubble filtration efficiency in the solution.

In one embodiment, the second filtering member may be a plate-shaped structure, and the plate-shaped structure is provided with second holes. When the second bubble filtration is performed, the solution is filtered through the plate-shaped structure.

In one embodiment, the plate-like structure may also be made of a metallic material.

In one embodiment, the solution may be a polyimide solution.

Figure 2:
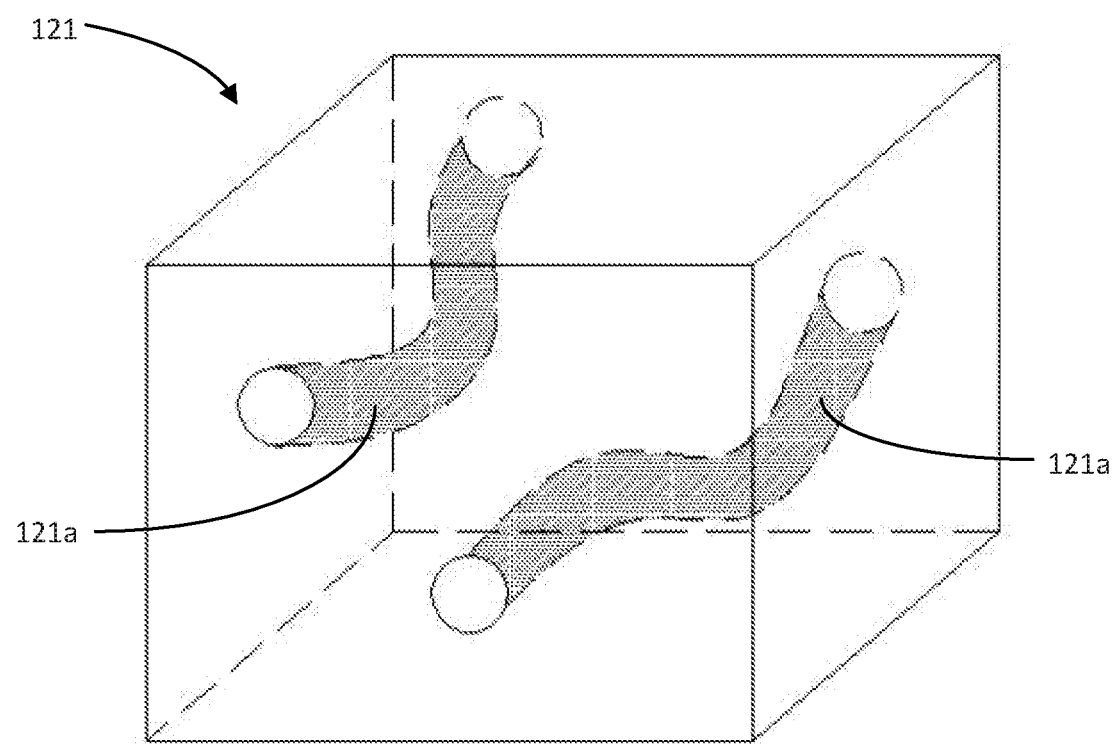
FIG. 2 is a schematic structural view of a filter body provided in a second embodiment of the present disclosure.

Referring to FIG. 2, which is a schematic structural view of a filter body 121 in accordance with a second embodiment of the present disclosure.

In one embodiment, because the gel is characterized by easy deformation, and the gel cannot be filtered by a method for filtering the bubbles, a separate gel filtering system 12 is required to filter the gel in the solution.

The filtering device 100 further includes a gel filtering system 12.

The gel filtering system 12 includes a filter body 121, the filter body 121 is provided with at least two filter through holes, and the solution passes through the filter through holes 121a.

In one embodiment, the filter body 121 is manufactured, using material which is absorptive to the gel in the solution and has little absorptive force to other substances in the solution. For example, when the solution is a polyimide solution, material of the filter body 121 is made of aluminum oxide.

In one embodiment, material of the filter body 121 may be selected based upon an extent of the absorptive force received by the solution flowing through the filter through holes 121a.

In one embodiment, it is considered that the gel in the solution may not have enough contact with the filter through holes 121a, so that by curving paths of the filter through holes 121a, the gel may be forced to sufficiently contact material of the filter body 121 in the filter through holes 121a, thereby increasing gel filtrating efficiency in the solution.

In one embodiment, the filter through holes 121a are non-linear filter through holes 121a.

In an embodiment, the gel filtering efficiency can be controlled by controlling an aperture size of the filter through holes 121a in the filter body 121, and the specific aperture size can be synthesized based upon actual needs. For example, when it is desired to shorten gel filtration duration of the solution, a filter body 121 with a slightly larger aperture size can be used. When it is desired to increase the gel filtration efficiency of the solution, the filter body 121 with a slightly smaller aperture size can be used.

In one embodiment, a diameter of the filter through holes 121a is not less than 1 µm and not more than 100 µm.

In an embodiment, the bubble filtering system 11 further includes a third bubble filtering system 113, and the third bubble filtering system 113 is configured to perform a third bubble filtration after the solution is filtered through the gel filtering system 12;

wherein filter fineness of the third bubble filtering system is higher than the filter fineness of the second bubble filtering system.

In one embodiment, the gel filtering system 12 is configured for the gel filtration before the bubble filtering system 11 performs the bubble filtration on the solution, and the third bubble filtering system 113 may not be provided at this time.

In one embodiment, the filtering device 100 further includes a stirring member and a reaction kettle.

The stirring member is configured to stir the solution to release a part of the bubbles in the solution.

The reaction kettle is configured to contain the solution.

In the present disclosure, the gel and the bubbles in the solution are stepwise filtered by the filtering device 100, which improves removal efficiency of the bubbles and the gels in the solution, thereby improving products yield in subsequent coating processes.

Figure 3:
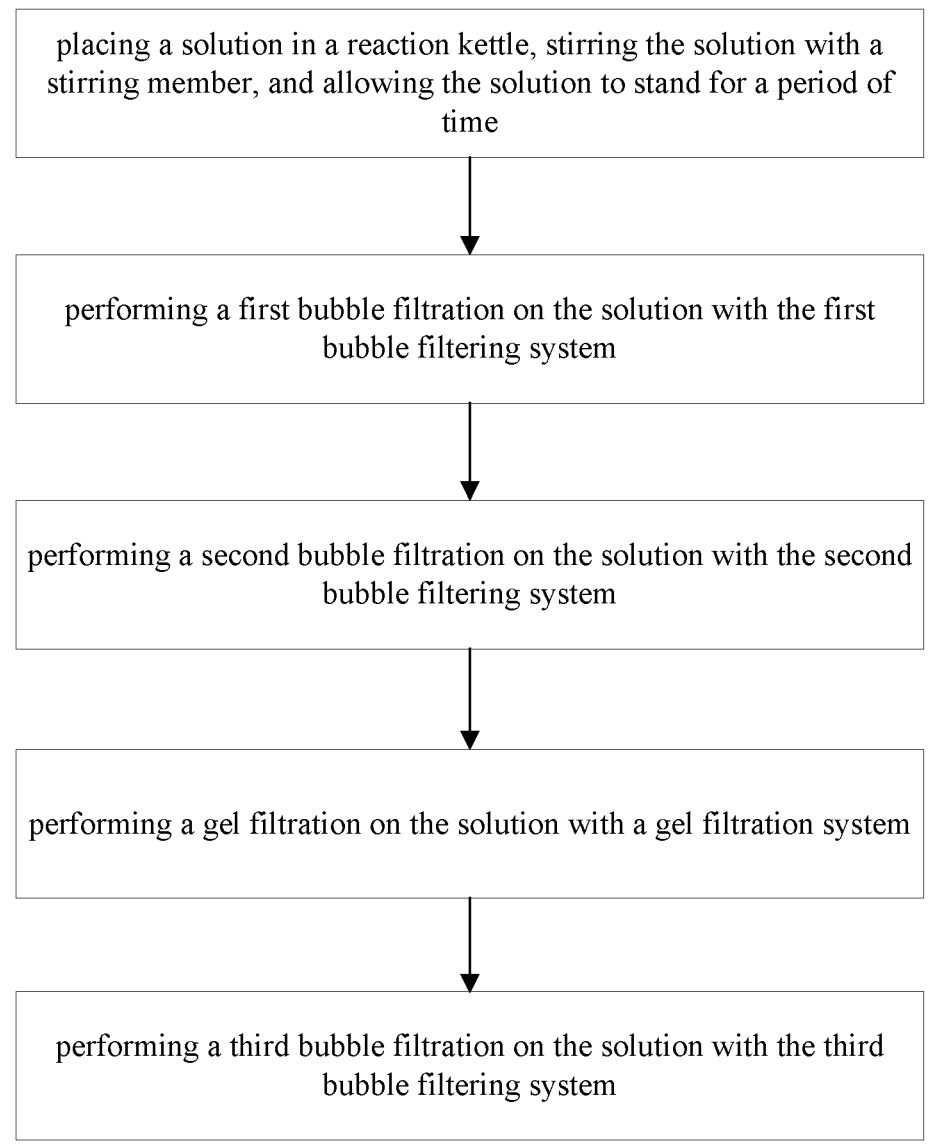
FIG. 3 is a flow chart of a method for filtering a solution provided in a third embodiment of the present disclosure.

Referring to FIG. 3, which is a flowchart of a method for filtering a solution in accordance with a third embodiment of the present disclosure.

In accordance with another aspect of the present disclosure, a method for filtering the solution performs filtrations on bubbles and gels in the solution. The filtering method includes:

placing the solution in a reaction kettle, stirring the solution with a stirring member, and allowing the solution to stand for a period of time;

performing a first bubble filtration on the solution with a first bubble filtering system 111;

performing a second bubble filtration on the solution with a the second bubble filtering system 112;

performing a gel filtration on the solution with a gel filtering system 12;

performing a third bubble filtration on the solution with a third bubble filtering system 113;

wherein filter finenesses of the first bubble filtering system 111, the second bubble filtering system 112, and the third bubble filtering system 113 are sequentially increased.

In one embodiment, the solution is filtered, using a filtering device 100, which includes a bubble filtering system 11 to filter the bubbles in the solution.

The bubble filtering system 11 includes:

the first bubble filtering system 111 configured for performing the first bubble filtration in the solution;

the second bubble filtering system 112 configured for performing the second bubble filtration in the solution; and the third bubble filtering system 113 configured for performing the third bubble filtration in the solution.

In one embodiment, the first bubble filtering system 111 includes a first passage configured for conveying the solution to a first filtering member; and the first filtering member includes first holes with a first diameter for filtering the bubbles in the solution being larger than the first diameter.

In one embodiment, the first diameter is no less than 1 µm.

In one embodiment, the first diameter may be 1 µm, e.g., the first bubble filtering system 111 is configured to remove the bubbles with diameters greater than 1 µm in the solution.

In one embodiment, the first filtering member may be a plate-shaped structure, and the plate-shaped structure is provided with first holes. When the first bubble filtration is performed, the solution is filtered through the plate-shaped structure.

In one embodiment, the plate-like structure may be made of a metallic material.

In the embodiment, the second bubble filtering system 112 includes a second passage configured for conveying the solution to a second filtering member, and the second filtering member includes second holes with a second diameter for filtering the bubbles in the solution being larger than the second diameter.

In one embodiment, the second diameter is no less than 0.45 µm and no greater than 1 µm.

In one embodiment, the second diameter may be 0.45 µm. In other words, the second filtering system is configured to remove the bubbles with diameters greater than 0.45 µm in the solution. That is, on the basis of the first bubble filtering system 111, a finer bubble filtration is performed, thereby effectively increasing bubble filtration efficiency in the solution.

In one embodiment, the second filtering member may be a plate-shaped structure, and the plate-shaped structure is provided with first holes. When the second bubble filtration is performed, the solution is filtered through the plate-shaped structure.

In one embodiment, the plate-like structure may be made of a metallic material.

In one embodiment, the solution may be a polyimide solution.

In one embodiment, because the gel is characterized by easy deformation, and the gel cannot be filtered by a method for filtering the bubbles, a separate gel filtering system 12 is required to filter the gel in the solution.

The filtering device 100 further includes a gel filtering system 12.

The gel filtering system 12 includes a filter body 121, the filter body 121 is provided with at least two filter through holes, and the solution passes through the filter through holes 121a.

In one embodiment, the filter body 121 is manufactured, using material which is absorptive to the gel in the solution and has little absorptive force to other substances in the solution. For example, when the solution is a polyimide solution, material of the filter body 121 is made of aluminum oxide.

In one embodiment, material of the filter body 121 may be selected based upon an extent of the absorptive force received by the solution flowing through the filter through holes 121a.

In one embodiment, it is considered that the gel in the solution may not have enough contact with the filter through holes 121a, so that by curving paths of the filter through holes 121a, the gel may be forced to sufficiently contact material of the filter body 121 in the filter through holes 121a, thereby increasing gel filtrating efficiency in the solution.

In one embodiment, the filter through holes 121a are non-linear filter through holes 121a.

In an embodiment, the gel filtering efficiency can be controlled by controlling an aperture size of the filter through holes 121a in the filter body 121, and the specific aperture size can be synthesized based upon actual needs. For example, when it is desired to shorten gel filtration duration of the solution, a filter body 121 with a slightly larger aperture size can be used. When it is desired to increase the gel filtrating efficiency of the solution, the filter body 121 with a slightly smaller aperture size can be used.

In one embodiment, a diameter of the filter through holes 121a is not less than 1 µm and not more than 100 µm.

In one embodiment, the solution is placed in the reaction kettle, and is stirred to release a portion of the bubbles adhering to other structures, such as gels, in the solution. The solution is allowed to stand for a period of time to allow the bubbles, which have not escaped, to be stably distributed in the solution.

In one embodiment, the stirring is performed, using the stirring member for a period of time, which is not less than 10 hours and not more than 40 hours, and the standing time is 12 hours.

Beneficial Effects: In the present disclosure, a filtering device and a filtering method are designed to perform the stepwise filtrations on the gel and the bubbles in the solution, thereby improving removal efficiency of the bubbles and the gels in the solution, thereby improving product yield in subsequent coating processes.

In summary, although the preferable embodiments of the present disclosure have been disclosed above, the embodiments are not intended to limit the present disclosure. A person of ordinary skill in the art, without departing from the spirit and scope of the present disclosure, can make various modifications and variations. Therefore, the scope of the disclosure is defined in the claims.

What is claimed is:

1. A filtering device for filtering a solution, comprising:
    a bubble filtering system configured for filtrating bubbles in the solution, the bubble filtering system comprises:
    a first bubble filtering system configured for performing a first bubble filtration in the solution;
    a second bubble filtering system configured for performing a second bubble filtration in the solution;
    a stirring member configured for stirring the solution to release a part of the bubbles in the solution; and
    a reaction kettle configured for containing the solution;
    wherein filter fineness of the second bubble filtering system is higher than filter fineness of the first bubble filtering system,
    wherein the filtering device further comprises a gel filtering system for filtering a gel in the solution,
    wherein the gel filtering system includes a filter body, the filter body is provided with at least two filter through holes, and the solution passes through the filter through holes, and
    wherein a diameter of the filter through holes is not smaller than 1 µm and not greater than 100 µM.

2. The filtering device as claimed in claim 1, wherein the first bubble filtering system includes a first passage configured for conveying the solution to a first filtering member; and the first filtering member includes first holes with a first diameter for filtering the bubbles in the solution being larger than the first diameter.

3. The filtering device as claimed in claim 2, wherein the second bubble filtering system includes a second passage configured for conveying the solution to a second filtering member; and the second filtering member includes second holes with a second diameter for filtering the bubbles in the solution being larger than the second diameter.

4. The filtering device as claimed in claim 1, wherein the solution is a polyimide solution.

5. The filtering device as claimed in claim 1, wherein material of the filter body includes aluminum oxide.

6. The filtering device as claimed in claim 1, wherein the filter through holes are non-linear filter through holes.

7. The filtering device as claimed claim 1,
    wherein the bubble filtrating system further includes a third bubble filtering system configured for performing a third bubble filtration after the solution is filtered through the gel filtering system;
    wherein filter fineness of the third bubble filtering system is higher than the filter fineness of the second bubble filtering system.

8. A method for filtering a solution using the filtering device recited in claim 7, comprising:
    placing a solution in the reaction kettle, stirring the solution with the stirring member, and allowing the solution to stand for a period of time;
    performing a first bubble filtration on the solution with the first bubble filtering system;
    performing a second bubble filtration on the solution with the second bubble filtering system;

performing a gel filtration on the solution with the gel filtering system; and performing a third bubble filtration on the solution with the third bubble filtering system;

wherein filter finenesses of the first bubble filtering system, the second bubble filtering system, and the third bubble filtering system are sequentially increased.

9. A filtering device for filtering a solution, comprising:

a bubble filtering system configured for filtrating bubbles in the solution, the bubble filtering system comprises:

a first bubble filtering system configured for performing a first bubble filtration in the solution;

a second bubble filtering system configured for performing a second bubble filtration in the solution;

wherein filter fineness of the second bubble filtering system is higher than filter fineness of the first bubble filtering system, wherein the filtering device further comprises a gel filtering system for filtering a gel in the solution, wherein the gel filtering system includes a filter body, the filter body is provided with at least two filter through holes, and the solution passes through the filter through holes, and wherein a diameter of the filter through holes is not smaller than 1 μm and not greater than 100 μm.

10. The filtering device as claimed in claim 9, wherein the first bubble filtering system includes a first passage configured for conveying the solution to a first filtering member; and the first filtering member includes first holes with a first diameter for filtering the bubbles in the solution being larger than the first diameter.

11. The filtering device as claimed in claim 10, wherein the second bubble filtering system includes a second passage configured for conveying the solution to a second filtering member; and the second filtering member includes second holes with a second diameter for filtering the bubbles in the solution being larger than the second diameter.

12. The filtering device as claimed in claim 9, wherein the solution is a polyimide solution.

13. The filtering device as claimed in claim 9, wherein material of the filter body includes aluminum oxide.

14. The filtering device as claimed in claim 9, wherein the filter through holes are non-linear filter through holes.

15. The filtering device as claimed in claim 9, wherein the bubble filtrating system further includes a third bubble filtering system configured for performing a third bubble filtration after the solution is filtered through the gel filtering system;

wherein filter fineness of the third bubble filtering system is higher than the filter fineness of the second bubble filtering system.

* * * * *